United States Patent
Noh et al.

(10) Patent No.: US 8,582,486 B2
(45) Date of Patent: Nov. 12, 2013

(54) REFERENCE SIGNAL TRANSMISSION METHOD FOR DOWNLINK MULTIPLE INPUT MULTIPLE OUTPUT SYSTEM

(75) Inventors: Yu Jin Noh, Seoul (KR); Ki Jun Kim, Sungnam-si (KR); Dae Won Lee, Seoul (KR); Bong Hoe Kim, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 244 days.

(21) Appl. No.: 13/131,596

(22) PCT Filed: Dec. 9, 2009

(86) PCT No.: PCT/KR2009/007348
§ 371 (c)(1),
(2), (4) Date: May 26, 2011

(87) PCT Pub. No.: WO2010/068029
PCT Pub. Date: Jun. 17, 2010

(65) Prior Publication Data
US 2011/0228718 A1    Sep. 22, 2011

Related U.S. Application Data

(60) Provisional application No. 61/120,852, filed on Dec. 9, 2008.

(30) Foreign Application Priority Data

Mar. 9, 2009    (KR) .................. 10-2009-0019783

(51) Int. Cl.
*H04H 20/71*    (2008.01)

(52) U.S. Cl.
USPC ........................................... 370/312; 370/436

(58) Field of Classification Search
USPC ........................................................ 370/312
See application file for complete search history.

(56) References Cited

U.S. PATENT DOCUMENTS

2007/0248113 A1    10/2007    Ko et al.
2009/0252077 A1*   10/2009    Khandekar et al. ........... 370/312
2010/0046412 A1*    2/2010    Varadarajan et al. ......... 370/312

FOREIGN PATENT DOCUMENTS

KR    1020070101808    10/2007
KR    1020080033060     4/2008
KR    1020080101269    11/2008

* cited by examiner

*Primary Examiner* — Sai-Ming Chan
(74) *Attorney, Agent, or Firm* — Lee, Hong, Degerman, Kang & Waimey

(57) ABSTRACT

A method for efficiently providing data and a reference signal (RS) when antennas are added to an existing system is provided. The method includes transmitting an RS in a downlink MIMO system that supports a first user equipment (UE) and a second UE, the first UE recognizing four predetermined transmitting antennas among eight transmitting antennas and the second UE recognizing the eight transmitting antennas, generating a subframe that can be recognized by both the first UE and the second UE and transmitting the generated subframe to the first UE and the second UE, where the first UE and the second UE recognize all orthogonal frequency division multiplexing (OFDM) symbols of the subframe.

15 Claims, 13 Drawing Sheets

REFERENCE SIGNAL TRANSMISSION METHOD FOR DOWNLINK MULTIPLE INPUT MULTIPLE OUTPUT SYSTEM

CROSS-REFERENCE TO RELATED APPLICATIONS

This application the National Stage filing under 35 U.S.C. 371 of International Application No. PCT/KR2009/007348, filed on Dec. 9, 2009, which claims the benefit of earlier filing date and right of priority to Korean Application No. 10-2009-0019783, filed on Mar. 9, 2009, and also claims the benefit of U.S. Provisional Application Ser. No. 61/120,852, filed on Dec. 9, 2008, the contents of all of which are incorporated by reference herein in their entireties.

TECHNICAL FIELD

The present invention relates to a multiple input multiple output (MIMO) communication system, and more particularly, to a method for efficiently providing data and a reference signal under the environment that antennas are added to the existing system.

BACKGROUND ART (1) Definition of Multi-Input Multi-Output (MIMO) Technology

MIMO technology means a method for improving efficiency in data transmission and reception by using multiple transmitting antennas and multiple receiving antennas instead of a single transmitting antenna and a single receiving antenna. Namely, the MIMO technology is to increase capacity or improve throughput by using multiple antennas in a transmitter or receiver of a wireless communication system. Herein, multiple antennas will be referred to as MIMO.

The MIMO technology is an application version of a technology that a single message is completed by receiving data pieces from several antennas without depending on a single antenna path. The MIMO technology can improve a data transmission rate in a specific range or increase a system range for a specific data transmission rate. In this respect, the MIMO technology is a next generation mobile communication technology that can widely be used for a mobile station and a relay station. Also, the MIMO technology has received much attention as a next generation technology that can increase a transmission rate of mobile communication, which has reached the uppermost limit due to extension of data communication.

(2) System Modeling in MIMO

FIG. 1 is a schematic view illustrating a general MIMO communication system. As illustrated in FIG. 1, if the number of transmitting antennas is $N_T$ and at the same time the number of receiving antennas increases to $N_R$, channel transmission capacity increases theoretically in proportion to the number of antennas unlike that a plurality of antennas are used in only a transmitter or receiver. Accordingly, it is possible to improve a transmission rate and remarkably improve frequency efficiency. A transmission rate according to increase of channel transmission capacity can increase theoretically as much as a value obtained by multiplying a maximum transmission rate $R_o$, which corresponds to a case where one antenna is used, by an increase rate $R_i$ of the following Equation 1.

$$R_i = \min(N_T, N_R) \quad \text{[Equation 1]}$$

For example, in a MIMO communication system that uses four transmitting antennas and four receiving antennas, a transmission rate that four times bigger than that of a single antenna system can be obtained. After theoretical capacity increase of the MIMO system has been proved in the middle of 1990, various technologies have been actively studied to substantially improve a data transmission rate. Some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and model of a MIMO system, and the study of time space signal processing technology for improvement of transmission reliability and transmission rate.

In order to describe a communication method in a MIMO system in more detail, mathematical modeling of the communication method can be expressed as follows. As illustrated in FIG. 1, it is assumed that $N_T$ transmitting antennas and $N_R$ receiving antennas exist. First of all, a transmitting signal will be described. If there exist $N_T$ transmitting antennas, since the number of maximum transmission information is $N_T$, the transmission information can be expressed by a vector shown in Equation 2 as follows.

$$s = [s_1, s_2, \ldots, s_{N_T}]^T \quad \text{[Equation 2]}$$

Meanwhile, different kinds of transmission power can be applied to each of the transmission information $s_1, s_2, \ldots, s_{N_T}$. At this time, supposing that each transmission power is $P_1, P_2, \ldots, P_{N_T}$, transmission information of which transmission power is controlled can be expressed by a vector shown in Equation 3 as follows.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$

Also, $\hat{s}$ can be expressed by Equation 4 below using a diagonal matrix P.

$$s = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, it is considered that a weight matrix W is applied to the information vector $\hat{s}$ of which transmission power is controlled, so as to obtain $N_T$ transmitting signals $x_1, x_2, \ldots, x_{N_T}$. In this case, the weight matrix serves to properly distribute the transmission information to each antenna. Such transmitting signals $x_1, x_2, \ldots, x_{N_T}$ can be expressed by Equation 5 below using a vector X. In this case, $W_{ij}$ means a weight value between the i th transmitting antenna and the j th information. W may be referred to as a weight matrix or precoding matrix.

$$x = \begin{bmatrix} x_1 \\ x_2 \\ \vdots \\ x_i \\ \vdots \\ x_{N_T} \end{bmatrix} \quad \text{[Equation 5]}$$

-continued $$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s}$$

$$= WPs$$

If there exist $N_R$ receiving antennas, receiving signals $y_1, y_2, \ldots, y_{N_R}$ of the respective antennas can be expressed by a vector of Equation 6 below.

$$y = [y_1, y_2, \ldots, y_{N_R}] \quad \text{[Equation 6]}$$

Meanwhile, in case of channel modeling in the MIMO communication system, channels can be classified depending on indexes of transmitting and receiving antennas. In this case, a channel that passes from the jth transmitting antenna to the ith receiving antenna will be expressed as $h_{ij}$. It is noted that index of the receiving antenna is prior to index of the transmitting antenna in index of $h_{ij}$.

Several channels can be grouped into one and then can be expressed by a vector type or a matrix type. The channels of a vector type will be described below. FIG. 2 is a diagram illustrating a channel from $N_T$ transmitting antennas to the ith receiving antenna.

As illustrated in FIG. 2, the channel from $N_T$ transmitting antennas to the ith receiving antenna can be expressed as follows.

$$h_i^T = [h_{i1}, h_{i2}, \ldots, h_{iN_T}] \quad \text{[Equation 7]}$$

Also, all channels from $N_T$ transmitting antennas to $N_R$ receiving antennas can be expressed by Equation 8 below through the matrix of Equation 7.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Since additive white Gaussian noise (AWGN) is actually added to the channels after the above channel matrix H, AWGN $n_1, n_2, \ldots, n_{N_R}$ added to each of the $N_R$ receiving antennas can be expressed by a vector of Equation 9 below.

$$n = [n_1, n_2, \ldots, n_{N_R}] \quad \text{[Equation 9]}$$

The receiving signals obtained using the above equations can be expressed by Equation 10 below.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & \ddots & \vdots \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

(3) Definition of Reference Signal

When a mobile communication system transmits packets, since the packets are transmitted through a radio channel, signal distortion may occur during transmission of the packets. In order to normally receive the distorted signal, a receiver should find out channel information and correct distortion of the signal as much as the channel information. In order to find out the channel information, when a signal known by both the transmitter and the receiver is received, the receiver finds out the channel information using a distortion status of the received signal. The signal known by both the transmitter and the receiver will be referred to as a pilot signal a reference signal (RS). The RS includes four types as illustrated in Table 1 depending on its purpose of use.

TABLE 1

| | Features |
|---|---|
| CQI-CRS | Common RS for channel measurement. Since UE(Use Equipment) determines CQI(Channel Quality Indicator), PMI(Precoding Matrix Index), RI(Rank Indicator), etc based on the CQI-CRS, the CQI-CRS is preferably distributed over all bands. |
| DM-CRS | Common RS for demodulation. But DM-CRS may be used for channel measurement. Since several UEs use the DM-CRS for channel measurement, a precoding scheme of a specific UE cannot be applied to the DM-CRS. Accordingly, if PDSCH(Physical Downlink Shared CHannel) is precoded, signaling is required through PDCCH(Physical Downlink Control CHannel). |
| NDM-DRS | Dedicated RS for non-precoded demodulation. |
| PDM-DRS | Dedicated RS for precoded demodulation. Since precoding is equally applied to both PDM-DRS and PDSCH, signaling is separately required for PDCCH. |

Recently, when most of mobile communication systems transmit and receive data packets using multiple antennas, a separate reference signal for each of transmitting antennas exists, and should know a channel status between each transmitting antenna and each receiving antenna to normally receive a signal.

Meanwhile, FIG. 3A is a diagram illustrating a structure of RS of normal cyclic prefix (CP) in a 3GPP LTE, and FIG. 3B is a diagram illustrating a structure of RS of extended cyclic prefix (CP) in a 3GPP LTE. In the current 3GPP LTE, a structure of a downlink RS is as illustrated in FIG. 3A and FIG. 3B. In one resource block, a horizontal axis means a time axis while a vertical axis means a frequency axis. One sub-frame includes two slots. FIG. 3A corresponds to a normal CP, wherein each slot includes seven symbols. FIG. 3B corresponds to extended CP, wherein each slot includes six symbols. The extended CP is generally used under the environment that delay is long. The number of base station transmitting antenna ports which are supported is four, and resources used to transmit RS for each of the antenna ports 0~3 are represented by 0, 1, 2 and 3.

(4) Time/Frequency Spacing of RS

In the 3GPP LTE, when considering 20 MHz system, one symbol includes 2048 samples. In this case, symbol duration is 66.67 μs. 1 μs corresponds to $10^{-6}$ seconds. Meanwhile, in case of normal CP, 160 samples are used in the first one of seven symbols as CP, and 144 samples are used in the other six symbols as CP. At this time, each of the symbols can cover channel delay spread equivalent to 5.2 μs and 4.69 μs. In case of the extended CP, since six symbols include 512 samples, they can cover channel delay spread equivalent to 16.67 μs. As seen from FIG. 3A and FIG. 3B, a transmission interval between RS for same antenna ports on the frequency axis of one symbol is 6. However, since staggering is given within one slot, a subcarrier interval between RS on the frequency axis is finally 3. In the present invention, the interval will mean a subcarrier interval on the frequency axis unless specified otherwise. In this case, it is assumed that the subcarrier interval is 15 kHz.

Meanwhile, the transmission interval of the RS and its channel estimation capability will be considered as follows using equations.

For example, if inverse discrete fourier transform is applied to sequence $x[i]=\{x_0, x_1, x_2, \ldots, x_{N-1}\}$, the following Equation 11 can be obtained.

$$X[k] = \sum_{i=0}^{N-1} x[i] \cdot e^{j2\pi k \frac{i}{N}}, k = 0, 1, \ldots, N-1 \quad \text{[Equation 11]}$$

Since RS is sent between data at constant intervals, if 0 is filled in N number of data between the respective RSs, sequence $$y[i] = \{x_0, \underbrace{0, 0, \ldots, 0}_{z \text{ zeros}}, x_1, \underbrace{0, 0, \ldots, 0}_{z \text{ zeros}}, x_2, \ldots, x_{N-1}, \underbrace{0, 0, \ldots, 0}_{z \text{ zeros}}\}$$

is obtained. If IDFT is applied to y[i], the following Equation 12 can be obtained.

$$Y[k] = \sum_{m=0}^{N(Z+1)-1} y[m] \cdot e^{j2\pi k \frac{m}{N(Z+1)}}, \quad \text{[Equation 12]}$$

$$k = 0, 1, \ldots, N(Z+1) - 1$$

In the Equation 12, since y[m] and x[i] are $$\begin{cases} y[m] = x[i], & m = (Z+1) \cdot i, \ i = 0, 1, \ldots, N-1 \\ y[m] = 0, & \text{otherwise,} \end{cases}$$

the relationship between Y[k] X[k] can be observed using the Equations 11 and 12 in such a manner that signals are repeatedly generated as much as the number of 0 as illustrated in Equation 13.

$$Y[k] = \{\underbrace{X[0], X[1], \ldots, X[N-1]}_{N \text{ samples}}, \quad \text{[Equation 13]}$$

$$\ldots, \underbrace{X[0], X[1], \ldots, X[N-1]}_{N \text{ samples}}\}$$

For example, if the interval of RS is 6, six signals are repeatedly generated in accordance with the Equation 13 as illustrated in FIG. 4. In this case, if channel delay spread does not exceed 11.11 μs, signal recovery can be performed theoretically. Namely, in case of the normal CP, since the number of CP samples is 160, 144, signal recovery can be performed even in the case that the transmission interval of RS is 6 when channel delay spread of maximum 5.2 μs and 4.69 μs occurs.

Meanwhile, in case of the extended CP, since the number of CP samples is 512, it is supposed that channel delay spread is maximum 16.67 μs. Accordingly, a problem occurs in that interference exists between symbols as illustrated in FIG. 5.

In order to solve the aforementioned problem, in the LTE, staggering is applied to RS of each antenna port, so that the transmission interval of the RS becomes 3. As illustrated in FIG. 6, if the transmission interval of the RS becomes 3, channel delay spread that can be covered reaches 22.22 μs, whereby signal recovery can be performed regardless of the length of the CP.

(5) Cyclic Delay in Time Domain

If sequence $x[i]=\{x_0, x_1, x_2, \ldots, x_{N-1}\}$ is cyclic shifted on the time axis, the relationship with the frequency axis will be observed as illustrated in Equation 4 below.

$$X'[k'] = \sum_{i=0}^{N-1} x[i] \cdot e^{j2\pi \frac{k'}{N} i} e^{j2\pi \frac{u}{M} i}, \quad \text{[Equation 14]}$$

$$N = MZ, k' = 0, 1, \ldots, N-1$$

$$= \sum_{i=0}^{N-1} x[i] \cdot e^{j2\pi \left(\frac{k'+uZ}{N}\right)i}$$

$$X'[(k-uZ)\bmod N] = \sum_{i=0}^{N-1} x[i] \cdot e^{j2\pi \frac{k}{N}i}$$

$$X'[(k-uZ)\bmod N] = X[k]$$

In other words, if $$e^{j2\pi \frac{u}{M} i}$$

is multiplied on the frequency axis, cyclic delay can occur on the time axis.

If the number of transmitting antennas that can be supported for a system that includes N number of antennas is additionally provided to support M(M>N) number of transmitting antennas, there exist an LTE UE (user equipment) that can recognize the existing N number of transmitting antennas only and an LTE-A UE that can recognize M number of transmitting antennas only. In this case, in addition to RS for supporting the existing N number of transmitting antennas, transmission of additional M-N number of RSs is required. At this time, under the environment that the LTE-A UE that recognizes M number of antennas is added to the LTE UE that recognizes the existing N number of antennas without additional signaling, efficient transmission of data and RS is required.

DISCLOSURE

Technical Problems

In order to solve the problems of the related art, an object of the present invention is to provide a method of efficiently transmitting data and RS under the environment that LTE UE and LTE-A UE coexist in a downlink MIMO system.

Technical Solutions

In order to achieve the object of the present invention, according to one aspect of the present invention, in a method of transmitting a reference signal (RS) in a downlink multi input multi output (MIMO) system that supports a first user equipment (UE) and a second UE, the first UE recognizing predetermined four transmitting antennas among eight transmitting antennas and the second UE recognizing the eight transmitting antennas, the method comprises generating a subframe that can be recognized by both the first UE and the second UE; and transmitting the generated subframe to the first UE and the second UE, wherein the first UE and the second UE recognize all orthogonal frequency division multiplexing (OFDM) symbols on the subframe, and reference signals (RSs) of the predetermined four antennas are mapped on OFDM symbols of the subframe equally to RS position on a subframe of a system only four transmitting antenna and RSs of the other antennas are mapped on the other OFDM symbols excluding the OFDM symbols where the RSs of the predetermined four antennas are mapped.

Preferably, 8, 8, 4, and 4 resource elements (REs) of one resource block (RB) are respectively allocated to the RSs of the predetermined four antennas per subframe, and 8, 8, 4, and 4 REs are respectively allocated to the RSs of the other antennas.

Preferably, 8, 8, 8, and 8 resource elements (REs) of one resource block (RB) are respectively allocated to the RSs of the predetermined four antennas per subframe, and 4, 4, 4, and 4 REs are respectively allocated to the RSs of the other antennas.

Preferably, 8, 8, 4, and 4 resource elements (REs) of one resource block (RB) are respectively allocated to the RSs of the predetermined four antennas per subframe, and 4, 4, 4, and 4 REs are respectively allocated to the RSs of the other antennas.

Preferably, 8, 8, 4, and 4 resource elements (REs) of one resource block (RB) are respectively allocated to the RSs of the predetermined four antennas per subframe, and 4, 4, 2, and 2 REs are respectively allocated to the RSs of the other antennas.

Preferably, RS transmission interval of same antenna ports viewed from a frequency axis in the subframe corresponds to three subcarriers on the frequency axis.

According to another aspect of the present invention, in a method of transmitting a reference signal (RS) in a downlink multi input multi output (MIMO) system that supports eight transmitting antennas, the method comprises generating a subframe including a reference signal (RS); and transmitting the generated subframe to a user equipment (UE), wherein RSs of predetermined four antennas among the eight transmitting antennas are mapped into a first OFDM symbol and a second OFDM symbol of the subframe and RSs of one or more antennas among the eight transmitting antennas are mapped into the other OFDM symbols, and the other OFDM symbols are recognized by only a UE that supports the eight transmitting antennas.

Preferably, 8, 8, 4, and 4 resource elements (REs) of one resource block (RB) are respectively allocated to the RSs of the predetermined four antennas per subframe and 8, 8, 4, and 4 REs are respectively allocated to the RSs of the other antennas.

Preferably, 8, 8, 8, and 8 resource elements (REs) of one resource block (RB) are respectively allocated to the RSs of the predetermined four antennas per subframe, and 4, 4, 4, and 4 REs are respectively allocated to the RSs of the other antennas.

Preferably, 8, 8, 4, and 4 resource elements (REs) of one resource block (RB) are respectively allocated to the RSs of the predetermined four antennas per subframe, and 4, 4, 4, and 4 REs are respectively allocated to the RSs of the other antennas.

Preferably, 8, 8, 4, and 4 resource elements (REs) of one resource block (RB) are respectively allocated to the RSs of the predetermined four antennas per subframe, and 4, 4, 2, and 2 REs are respectively allocated to the RSs of the other antennas.

Preferably, the subframe is a multicast broadcast single frequency network (MBSFN) subframe.

Preferably, RS transmission interval of same antenna ports viewed from a frequency axis in the subframe corresponds to three subcarriers on the frequency axis.

Preferably, the RSs of the other antennas excluding the predetermined four antennas are common reference signals (CRSs).

According to other aspect of the present invention, in a method of transmitting a reference signal (RS) in a downlink multi input multi output (MIMO) system that supports a first user equipment (UE) and a second UE, the first UE recognizing N(M>N) number of transmitting antennas of a total of M number of transmitting antennas and the second UE recognizing the M number of transmitting antennas, the method comprises transmitting a first subframe that can be recognized by both the first UE and the second UE; and transmitting a second subframe that can be recognized by the second UE only, wherein common reference signals (CRSs) of antenna ports 0 to N−1 of the M number of transmitting antennas are mapped into the first subframe, and CRSs of antenna ports N to M−1 of the M number of transmitting antennas are mapped into the second subframe.

Preferably, RSs of the antenna ports 0 to N−1 are mapped into a first OFDM symbol and a second OFDM symbol of the second subframe, and RSs of the antenna ports N to M−1 are mapped into the other OFDM symbols.

Preferably, the N is 4, and the M is 8.

Preferably, the second subframe is a multicast broadcast single frequency network (MBSFN) subframe.

Preferably, dedicated reference signals (DRSs) of the antenna ports 0 to N−1 are mapped into a part of the other OFDM symbols of the second subframe.

Advantageous Effects

According to the present invention, the method of efficiently transmitting data and RS under the environment that LTE UE and LTE-A UE coexist in a downlink MIMO system is provided.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, the following description will be made based on, but not limited to, some terminologies. And, other random terminologies may be designated to refer to the same meaning. Wherever possible, the same reference numbers will be used throughout the drawings to refer to the same or like parts.

Figure 1:
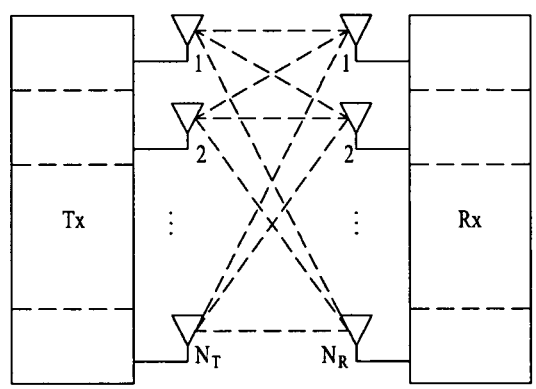
FIG. 1 is a schematic view illustrating a general MIMO communication system.
Figure 2:
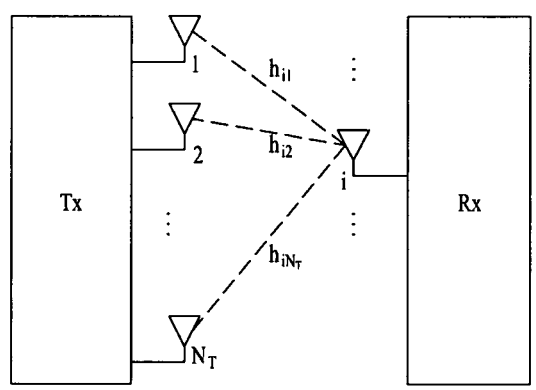
FIG. 2 is a diagram illustrating a channel from $N_7$ transmitting antennas to an ith receiving antenna.
Figure 3A:
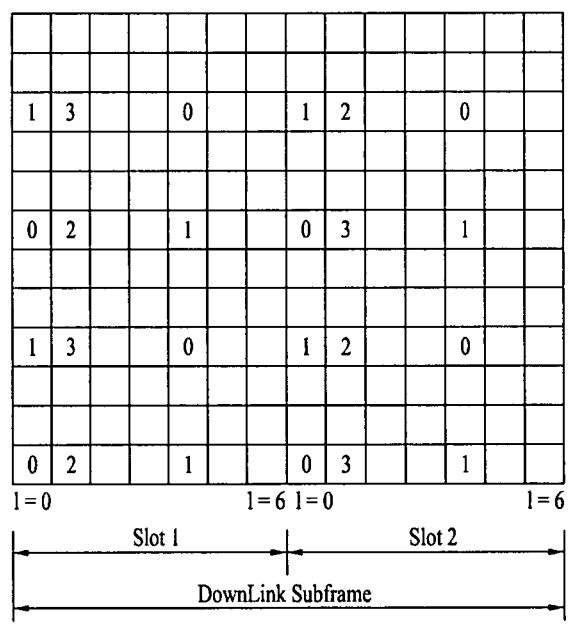
FIG. 3A is a diagram illustrating a subframe for transmitting RS in case of normal cyclic prefix (CP) in a 3GPP LTE.
Figure 3B:
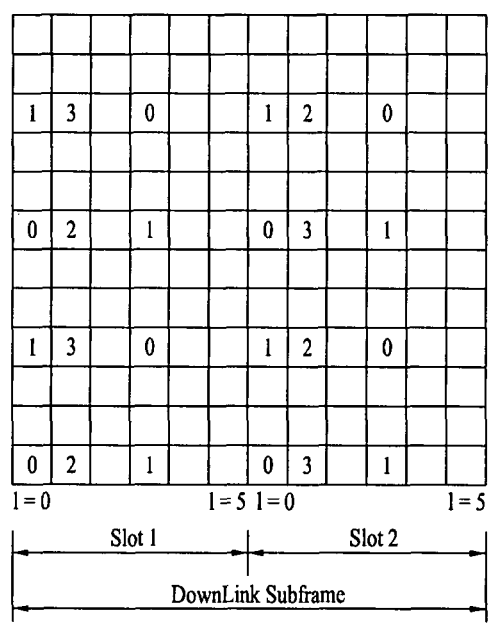
FIG. 3B is a diagram illustrating a subframe for transmitting RS in case of extended cyclic prefix (CP) in a 3GPP LTE.
Figure 4:
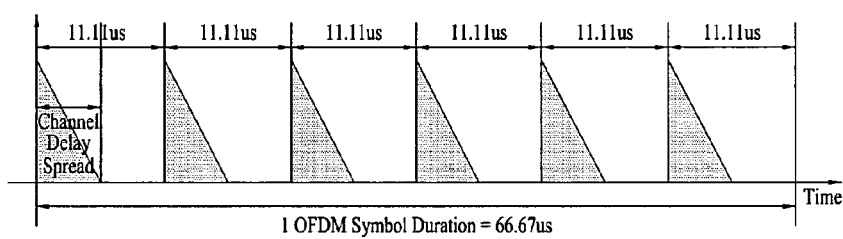
FIG. 4 is a diagram illustrating outputs of symbols depending on time when a transmission interval of RS is 6.
Figure 5:
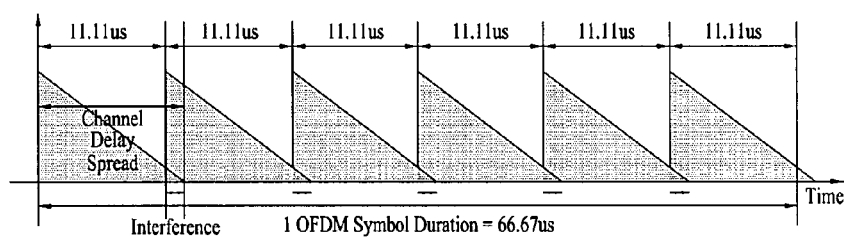
FIG. 5 is a diagram illustrating outputs of symbols depending on time when a transmission interval of RS is 6 in case of extended CP.
Figure 6:
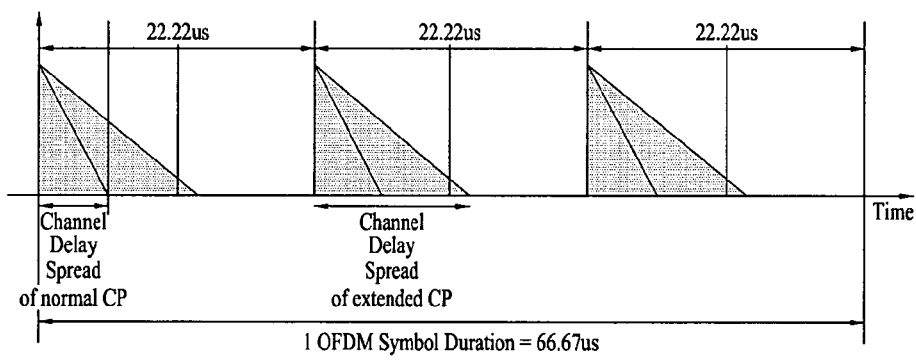
FIG. 6 is a diagram illustrating outputs of symbols depending on time when a transmission interval of RS is 3 in case of normal CP and extended CP.

In a 3GPP LTE downlink, four antennas are used, and reference signals for the four antennas are as illustrated in FIG. 3A and FIG. 3B. However, since LTE-A (LTE-Advanced) supports MIMO of increased antennas in a downlink, RSs should increase correspondingly. There are provided various methods such as a code division multiplexing (CDM) method, a frequency division multiplexing (FDM) method, and a time division multiplexing (TDM) method, to define RS pattern of each of antenna ports. Although terminologies, normal CP and extended CP, have been used based on the LTE system, these terminologies can be used even in a system that covers channel delay. Accordingly, normal CP and extended CP for each of short channel delay and large channel delay will be described respectively.

Meanwhile, in the 3GPP LTE system if signaling of multicast broadcast single frequency network (MBSFN) subframe is performed for LTE UE (User Equipment), the LTE UE does not read out a data part of the subframe and thus does not use channel information either. Accordingly, the LTE UE uses only channel information of a subframe received thereto or only channel information in a subframe that supports four antennas. The MBSFN subframe is only exemplary, and comprehensively means any other subframes that restrict the operation of the LTE UE.

Figure 7:
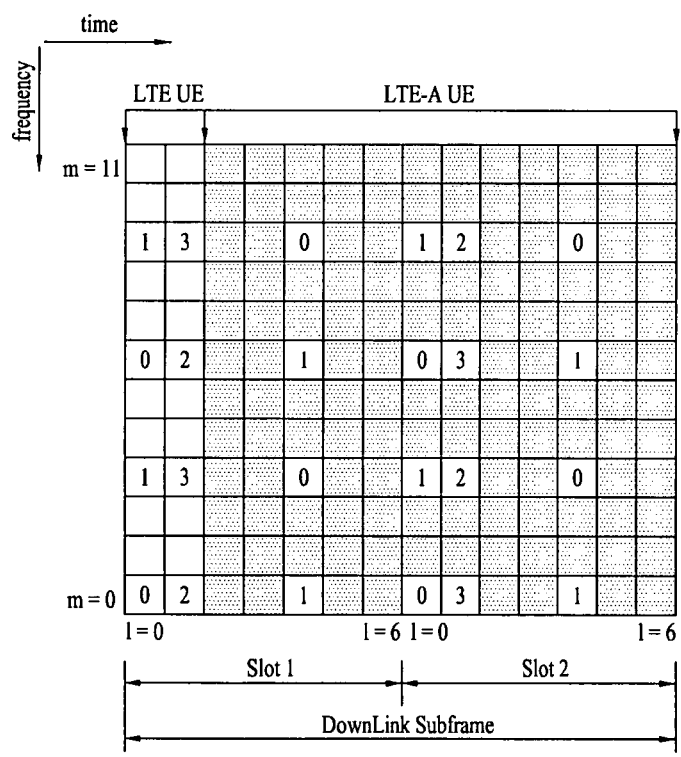
FIG. 7 is a diagram illustrating a structure of MBSFN subframe when channel delay spread is short in accordance with one embodiment of the present invention.

Meanwhile, since a UE that can recognize eight antennas can be signaled that a corresponding subframe supports eight antennas, it can use channel information sufficiently. In the subframe recognized by the LTE UE as MBSFN, symbols other than first two symbols are resources that can allow LTE-A UE to transmit RS freely regardless of the operation of the LTE UE. Namely, in FIG. 7, if the MBSFN subframe is signaled, the LTE UE uses only information of l=0 and l=1 of slot 1. Accordingly, a method of transmitting additional RS for LTE-A UE to the other symbols will be suggested. Of course, the LTE-A UE can also use symbols of l=0 and l=1 of slot 1.

(1) Method of Defining Subframe for Channel Quality Indicator-Common Reference Signal (CQI-CRS)

In the LTE, although antenna port 5 is defined for beamforming, eight antenna ports will be defined as antenna ports 0 to 7 for convenience of description in the present invention. As the number of antennas increases to eight, a method of transmitting a dedicated reference signal (DRS) for antenna ports 4 to 7 in addition to a demodulation-common reference signal (DM-CRS) of the existing antenna ports 0 to 3 will be considered for demodulation. Since the DRS is transmitted only when data are transmitted to a specific UE, resources can be used efficiently. However, the DRS cannot be used for channel measurement of the antenna ports 4 to 7. Since the CQI-CRS should be transmitted separately, it is suggested that a subframe for channel measurement will be defined separately.

The following Table 2 illustrates the number of resource elements (RE) allocated to RS of each antenna port in one resource block per subframe.

TABLE 2

| Antenna port | 0 | 1 | 2 | 3 |
|---|---|---|---|---|
| The number of REs allocated to RS corresponding to each antenna port in one RB | 8 REs | 8 REs | 4 REs | 4 REs |

In the LTE system, the numbers of RSs of the antenna ports 0 to 3 are 8, 8, 4, 4, respectively, per subframe, and maximum overhead of 15% or less is maintained. However, since a subframe for CQI-CRS is not needed to be transmitted frequently, overhead bigger than 15% may be maintained. In order to transmit CQI-CRS, two types of subframes may be used.

The first type of subframe is the existing subframe that can be used both by the LTE UE and the LTE-A UE. In this case, the LTE UE uses the existing RS transmission position defined for the antenna ports 0 to 3. The LTE-A UE uses the RS for the antenna ports 0 to 3 and at the same time can identify the RS for the antenna ports 4 to 7 through signaling.

However, since the subframe defined for CQI-CRS is sometimes signaled, the LTE-UE cannot transmit data. Even though the LTE-UE transmits data, since it recognizes the RS for the antenna ports 4 to 7 as data, a problem may occur in view of throughput. Accordingly, scheduling should be considered additionally. Even though the LTE-A is newly provided, it may not be preferable that it affects throughput of the existing system.

The second type is to perform signaling a subframe of which only a part can be recognized by the LTE UE or a subframe of which whole part cannot be recognized by LTE UE. An example of the subframe includes MBSFN subframe. As described above, the MBSFN subframe for CQI-CRS has overhead of 15% and can transmit RS in accordance with FDM without restriction. The following Table 3 illustrates the number of resource elements (RE) in one resource block (RB), which are allocated to RS of each antenna port per subframe in the MIMO system that supports eight transmitting antennas. In respect of each case of Table 3, FIG. 8A, FIG. 9A, FIG. 10A and FIG. 11A illustrate that channel delay spread is short, and FIG. 8B, FIG. 9B, FIG. 10B and FIG. 11B illustrate that channel delay spread is large.

TABLE 3

| | | Antenna port | | | | | | | |
|---|---|---|---|---|---|---|---|---|---|
| | | 0 | 1 | 2 | 3 | 4 | 5 | 6 | 7 |
| The number of REs allocated to RS corresponding to each antenna port in one RB | Case 1 | 8 REs | 8 REs | 4 REs | 4 REs | 8 REs | 8 REs | 4 REs | 4 REs |
| | Case 2 | 8 REs | 8 REs | 8 RES | 8 REs | 4 REs | 4 REs | 4 REs | 4 REs |
| | Case 3 | 8 RES | 8 REs | 4 RES | 4 REs | 4 REs | 4 REs | 4 REs | 4 REs |
| | Case 4 | 8 REs | 8 REs | 4 RES | 4 REs | 4 REs | 4 REs | 2 REs | 2 REs |

In each drawing, 4, 5, 6, 7 mean RSs for antenna ports 4, 5, 6, 7. Since the LTE UE can recognize only symbols 0 and 1 of the first slot (slot 1) and the LTE-A UE can recognize all symbols of the subframe, data transmission can freely be performed by excluding the position of the RS. Meanwhile, in the LTE, since a primary synchronization channel and a secondary synchronization channel are transmitted to subframes 0 and 5, the last two symbols in slot 1 cannot be used to transmit the RS. However, in case of the subframe for CQI-CRS, since the CQI-CRS is only transmitted to all subframes excluding the subframes 0 and 5, all symbols can be used for RS transmission.

Figure 8:
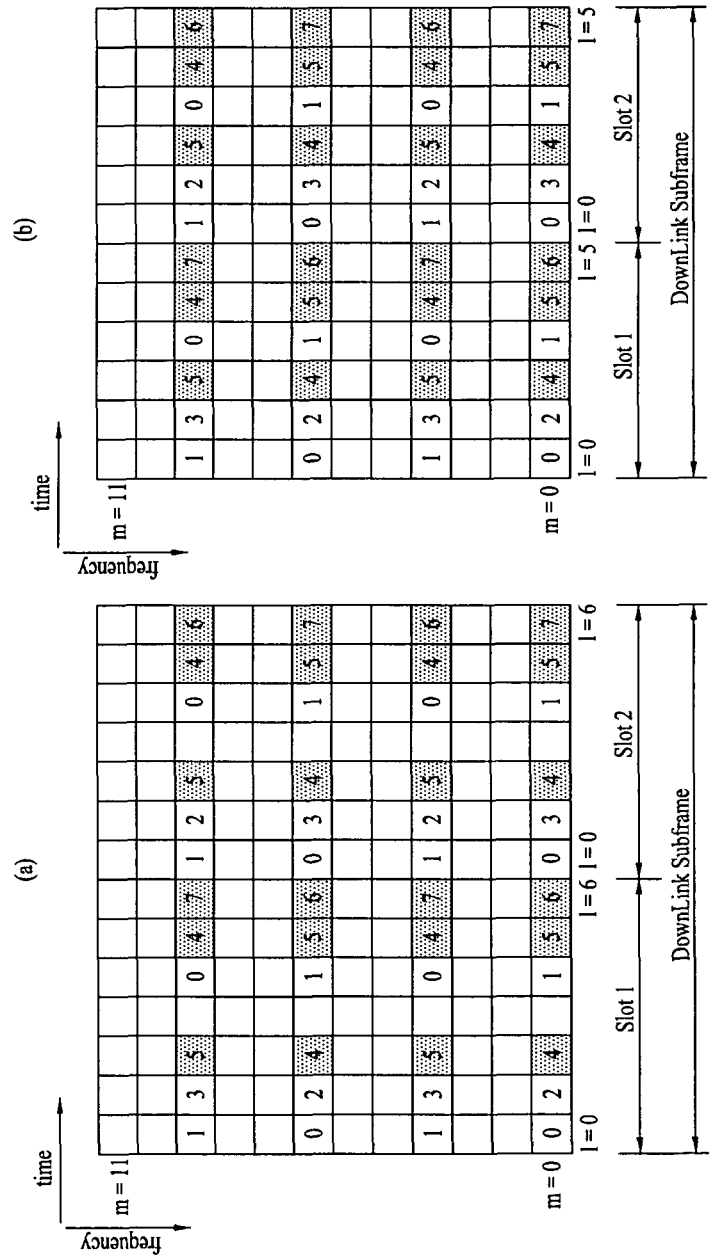
FIG. 8A and FIG. 8B are diagrams illustrating a first example of a subframe for transmitting CQI-CRS in case of normal CP and extended CP.

In respect of case 1 of Table 3, 8 REs, 8 REs, 4 REs, and 4 REs are respectively applied to the numbers of RSs of the antenna ports 0 to 3, and 8 REs, 8 REs, 4 REs, and 4 REs are respectively applied to the numbers of RSs of the antenna ports 4 to 7. FIG. 8A and FIG. 8B respectively illustrate structures of a subframe of case 1 for CQI-CRS transmission in case of normal CP and extended CP.

RS pattern on a subframe illustrated in FIG. 8A can be represented using a mapping position of RS corresponding to each antenna port. Particularly, the RS pattern can be represented by coordinates (l,m) using index l of OFDM symbols on the time axis and index m of subcarriers on the frequency axis as illustrated in Table 4 below.

TABLE 4

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (6, 0) | (6, 3) |
| | (l, m) | (0, 6) | (0, 9) | (1, 6) | (1, 9) | (2, 6) | (2, 9) | (6, 6) | (6, 9) |
| | (l, m) | (4, 3) | (4, 0) | | | (5, 3) | (5, 0) | | |
| | (l, m) | (4, 9) | (4, 6) | | | (5, 9) | (5, 6) | | |
| Slot 2 | (l, m) | (0, 0) | (0, 3) | (1, 3) | (1, 0) | (2, 0) | (2, 3) | (6, 3) | (6, 0) |
| | (l, m) | (0, 6) | (0, 9) | (1, 9) | (1, 6) | (2, 6) | (2, 9) | (6, 9) | (6, 6) |
| | (l, m) | (4, 3) | (4, 0) | | | (5, 3) | (5, 0) | | |
| | (l, m) | (4, 9) | (4, 6) | | | (5, 9) | (5, 6) | | |

Meanwhile, RS pattern on a subframe illustrated in FIG. 8B can be represented using a mapping position of RS corresponding to each antenna port. Particularly, the RS pattern can be represented by coordinates (l,m) using index of OFDM symbols on the time axis and index m of subcarriers on the frequency axis as illustrated in Table 5 below.

TABLE 5

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (3, 3) | (3, 0) | | | (4, 3) | (4, 0) | | |
| | (l, m) | (3, 9) | (3, 6) | | | (4, 9) | (4, 6) | | |
| Slot 2 | (l, m) | (0, 0) | (0, 3) | (1, 3) | (1, 0) | (2, 0) | (2, 3) | (5, 3) | (5, 0) |
| | (l, m) | (0, 6) | (0, 9) | (1, 9) | (1, 6) | (2, 6) | (2, 9) | (5, 9) | (5, 6) |
| | (l, m) | (3, 3) | (3, 0) | | | (4, 3) | (4, 0) | | |
| | (l, m) | (3, 9) | (3, 6) | | | (4, 9) | (4, 6) | | |

As illustrated in FIG. 8A and FIG. 8B, the RS transmission position of the antenna ports 0 to 3 in the same as that in case of the LTE subframe, and RS transmission of additional antenna ports is performed using the other symbols. In the same manner as the existing LTE, RS transmission interval of additional antenna ports is 6 per symbol. If channel measurement is performed for two symbols, since the transmission interval becomes 3, throughput is not deteriorated even in the case that channel delay spread is large. The RS is transmitted to most of symbols. Particularly, if channel delay spread is large, the RS is transmitted to all symbols as illustrated in FIG. 8B.

In respect of case 1 of Table 3, since 8 REs, 8 REs, 4 REs, and 4 REs are respectively applied to the numbers of RSs of the antenna ports 0 to 3 in case of the LTE, the number of RSs transmitted from the antenna ports 2 and 3 is smaller than that of RSs transmitted from the antenna ports 0 and 1. However, considering that the number of antennas has increased and UEs of Rank 3 or over will be more increased than before, more exact measurement of RS is required. Accordingly, it is preferable that the same number of RSs transmitted to the antenna ports 0 and 1 is also transmitted to the antenna ports 2 and 3.

Figure 9:
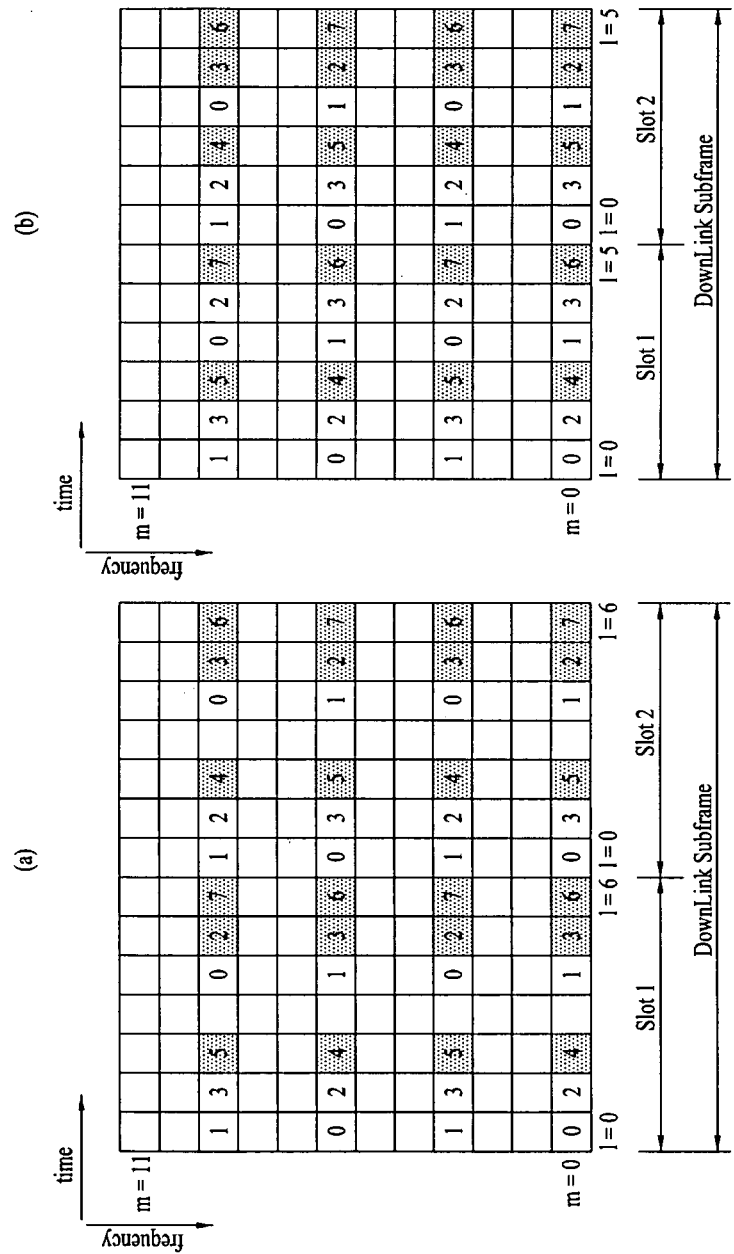
FIG. 9A and FIG. 9B are diagrams illustrating a second example of a subframe for transmitting CQI-CRS in case of normal CP and extended CP.

In this respect, it is noted from case 2 that 8 REs, 8 REs, 8 REs, and 8 REs are respectively applied to the numbers of RSs of the antenna ports 0 to 3, and 4 REs, 4 REs, 4 REs, and 4 REs are respectively applied to the numbers of RSs of the antenna ports 4 to 7. FIG. 9A and FIG. 9B respectively illustrate structures of a subframe of case 2 for CQI-CRS transmission in case of normal CP and extended CP.

RS pattern on a subframe illustrated in FIG. 9A can be represented using a mapping position of RS corresponding to each antenna port. Particularly, the RS pattern can be represented by coordinates (l,m) using index l of OFDM symbols on the time axis and index m of subcarriers on the frequency axis as illustrated in Table 6 below.

TABLE 6

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (6, 0) | (6, 3) |
| | (l, m) | (0, 6) | (0, 9) | (1, 6) | (1, 9) | (2, 6) | (2, 9) | (6, 6) | (6, 9) |
| | (l, m) | (4, 3) | (4, 0) | (5, 3) | (5, 0) | | | | |
| | (l, m) | (4, 9) | (4, 6) | (5, 9) | (5, 6) | | | | |
| Slot 2 | (l, m) | (0, 0) | (0, 3) | (1, 3) | (1, 0) | (2, 3) | (2, 0) | (6, 3) | (6, 0) |
| | (l, m) | (0, 6) | (0, 9) | (1, 9) | (1, 6) | (2, 9) | (2, 6) | (6, 9) | (6, 6) |
| | (l, m) | (4, 3) | (4, 0) | (5, 0) | (5, 3) | | | | |
| | (l, m) | (4, 9) | (4, 6) | (5, 6) | (5, 9) | | | | |

Meanwhile, RS pattern on a subframe illustrated in FIG. 9B can be represented using a mapping position of RS corresponding to each antenna port. Particularly, the RS pattern can be represented by coordinates (l,m) using index of OFDM symbols on the time axis and index m of subcarriers on the frequency axis as illustrated in Table 7 below.

TABLE 7

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (3, 3) | (3, 0) | (4, 3) | (4, 0) | | | | |
| | (l, m) | (3, 9) | (3, 6) | (4, 9) | (4, 6) | | | | |
| Slot 2 | (l, m) | (0, 0) | (0, 3) | (1, 3) | (1, 0) | (2, 3) | (2, 0) | (5, 3) | (5, 0) |
| | (l, m) | (0, 6) | (0, 9) | (1, 9) | (1, 6) | (2, 6) | (2, 6) | (5, 9) | (5, 6) |
| | (l, m) | (3, 3) | (3, 0) | (4, 0) | (4, 3) | | | | |
| | (l, m) | (3, 9) | (3, 6) | (4, 6) | (4, 9) | | | | |

As illustrated in FIG. 9A and FIG. 9B, the RS transmission position of the antenna ports 0 and 1 is the same as that in case of the LTE subframe, and RS transmission of additional antenna ports is performed using the other symbols. In the same manner as the existing LTE, RS transmission interval of additional antenna ports is 6 per symbol. If channel measurement is performed for two symbols, since the transmission interval becomes 3, throughput is not deteriorated even in the case that channel delay spread is large. The RS is transmitted to most of symbols. Particularly, if channel delay spread is large, the RS is transmitted to all symbols as illustrated in FIG. 9B.

Figure 10:
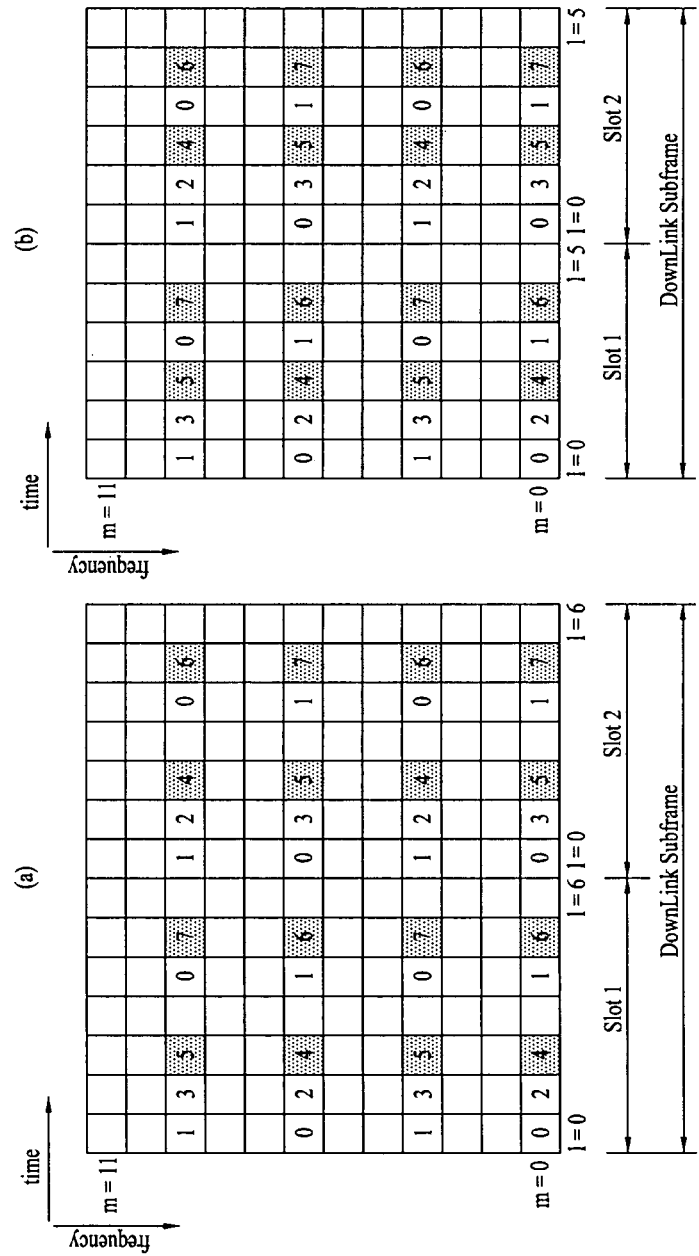
FIG. 10A and FIG. 10B are diagrams illustrating a third example of a subframe for transmitting CQI-CRS in case of normal CP and extended CP.

In respect of case 3 of Table 3, 8 REs, 8 REs, 4 REs, and 4 REs are respectively applied to the numbers of RSs of the antenna ports 0 to 3 in the same manner as that in Table 2, and 8 REs, 8 REs, 4 REs, and 4 REs are respectively applied to the numbers of RSs of the antenna ports 4 to 7. FIG. 10A and FIG. 10B respectively illustrate structures of a subframe of case 3 for CQI-CRS transmission in case of normal CP and extended CP.

RS pattern on a subframe illustrated in FIG. 10A can be represented using a mapping position of RS corresponding to each antenna port. Particularly, the RS pattern can be represented by coordinates (l,m) using index l of OFDM symbols on the time axis and index m of subcarriers on the frequency axis as illustrated in Table 8 below.

TABLE 8

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (4, 3) | (4, 0) | | | | | | |
| | (l, m) | (4, 9) | (4, 6) | | | | | | |
| Slot 2 | (l, m) | (0, 0) | (0, 3) | (1, 3) | (1, 0) | (2, 3) | (2, 0) | (5, 3) | (5, 0) |
| | (l, m) | (0, 6) | (0, 9) | (1, 9) | (1, 6) | (2, 9) | (2, 6) | (5, 9) | (5, 6) |
| | (l, m) | (4, 3) | (4, 0) | | | | | | |
| | (l, m) | (4, 9) | (4, 6) | | | | | | |

Meanwhile, RS pattern on a subframe illustrated in FIG. 10B can be represented using a mapping position of RS corresponding to each antenna port. Particularly, the RS pattern can be represented by coordinates (l,m) using index l of OFDM symbols on the time axis and index m of subcarriers on the frequency axis as illustrated in Table 9 below.

TABLE 9

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (4, 0) | (4, 3) |
| | (l, m) | (0, 6) | (0, 9) | (1, 6) | (1, 9) | (2, 6) | (2, 9) | (4, 6) | (4, 9) |
| | (l, m) | (3, 3) | (3, 0) | | | | | | |
| | (l, m) | (3, 9) | (3, 6) | | | | | | |
| Slot 2 | (l, m) | (0, 0) | (0, 3) | (1, 3) | (1, 0) | (2, 3) | (2, 0) | (4, 3) | (4, 0) |
| | (l, m) | (0, 6) | (0, 9) | (1, 9) | (1, 6) | (2, 9) | (2, 6) | (4, 9) | (4, 6) |
| | (l, m) | (3, 3) | (3, 0) | | | | | | |
| | (l, m) | (3, 9) | (3, 6) | | | | | | |

As illustrated in FIG. 10A and FIG. 10B, since 4 REs are applied to the number of RSs of the existing antenna ports 2 and 3, in the case that the LTE-A system supports antenna ports 0 to 7, it is suggested that the numbers of RSs per antenna port of additional antenna ports 4 to 7 will be limited to 4 REs, respectively. Namely, although exact channel estimation can be performed if the number of RSs increases, the number of RSs of the antenna ports 2 and 3 is limited to 4 REs under the LTE system that supports four antennas. Accordingly, the number of RSs per antenna (e.g., antenna port 4 to 7) will be limited even though the number of antennas increases. The RS transmission position of the antenna ports 0 to 3 is the same as that in case of the LTE subframe, and RS transmission of additional antenna ports is performed using the other symbols.

In the same manner as the existing LTE, RS transmission interval of additional antenna ports is 6 per symbol. If channel measurement is performed for two symbols, since the transmission interval becomes 3, throughput is not deteriorated even in the case that channel delay spread is large. In case 3, the number of RSs is relatively smaller than that of RSs in cases 1 and 2. However, since more data can be transmitted, if there is no big difference in throughput of channel measurement between the case 3 and the cases 1 and 2, the case 3 could be the method of using resources more efficiently.

Figure 11:
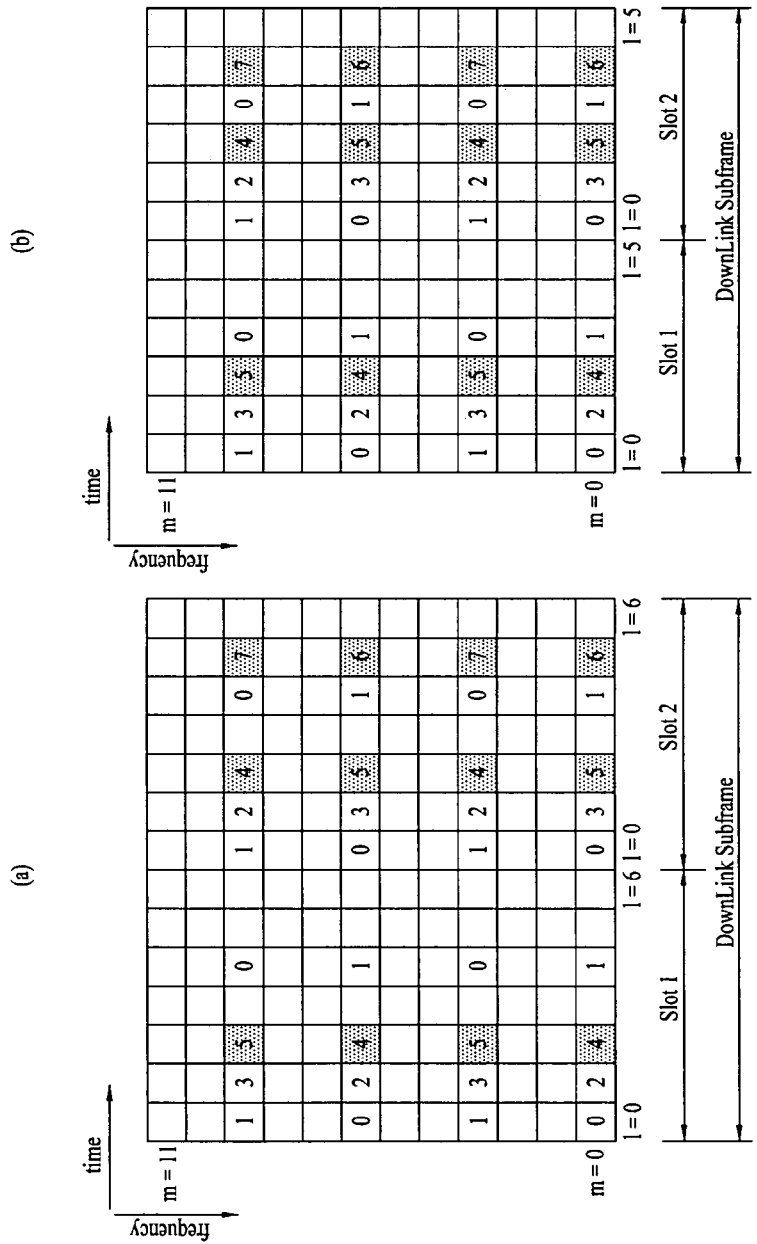
FIG. 11A and FIG. 11B are diagrams illustrating a fourth example of a subframe for transmitting CQI-CRS in case of normal CP and extended CP.

In respect of case 4 of Table 3, 8 REs, 8 REs, 4 REs, and 4 REs are respectively applied to the numbers of RSs of the antenna ports 0 to 3 in the same manner as that in Table 2, and 4 REs, 4 REs, 2 REs, and 2 REs are respectively applied to the numbers of RSs of the antenna ports 4 to 7. FIG. 11A and FIG. 11B respectively illustrate structures of a subframe of case 4 for CQI-CRS transmission in case of normal CP and extended CP.

RS pattern on a subframe illustrated in FIG. 11A can be represented using a mapping position of RS corresponding to each antenna port. Particularly, the RS pattern can be represented by coordinates (l,m) using index l of OFDM symbols on the time axis and index m of subcarriers on the frequency axis as illustrated in Table 10 below.

TABLE 10

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | | |
| | (l, m) | (0, 6) | (0, 9) | (1, 6) | (1, 9) | (2, 6) | (2, 9) | | |
| | (l, m) | (4, 3) | (4, 0) | | | | | | |
| | (l, m) | (4, 9) | (4, 6) | | | | | | |
| Slot 2 | (l, m) | (0, 0) | (0, 3) | (1, 3) | (1, 0) | (2, 3) | (2, 0) | (5, 0) | (5, 3) |
| | (l, m) | (0, 6) | (0, 9) | (1, 9) | (1, 6) | (2, 9) | (2, 6) | (5, 6) | (5, 9) |
| | (l, m) | (4, 3) | (4, 0) | | | | | | |
| | (l, m) | (4, 9) | (4, 6) | | | | | | |

Meanwhile, RS pattern on a subframe illustrated in FIG. 11B can be represented using a mapping position of RS corresponding to each antenna port. Particularly, the RS pattern can be represented by coordinates (l,m) using index of OFDM symbols on the time axis and index m of subcarriers on the frequency axis as illustrated in Table 11 below.

TABLE 11

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | | |
| | (l, m) | (0, 6) | (0, 9) | (1, 6) | (1, 9) | (2, 6) | (2, 9) | | |
| | (l, m) | (3, 3) | (3, 0) | | | | | | |
| | (l, m) | (3, 9) | (3, 6) | | | | | | |
| Slot 2 | (l, m) | (0, 0) | (0, 3) | (1, 3) | (1, 0) | (2, 3) | (2, 0) | (4, 0) | (4, 3) |
| | (l, m) | (0, 6) | (0, 9) | (1, 9) | (1, 6) | (2, 9) | (2, 6) | (4, 6) | (4, 9) |
| | (l, m) | (3, 3) | (3, 0) | | | | | | |
| | (l, m) | (3, 9) | (3, 6) | | | | | | |

As illustrated in FIG. 11A and FIG. 11B, since 4 REs are applied to the number of RSs of the existing antenna ports 2 and 3, in the case that the LTE-A system supports antenna ports 0 to 7, it is suggested that the numbers of RSs of additional antenna ports 4 and 5 will be limited to 4 REs and the numbers of RSs of additional antenna ports 6 and 7 will be limited to two REs, respectively. Namely, although exact channel estimation can be performed if the number of RSs increases, the number of RSs of the antenna ports 2 and 3 is limited to 4 REs under the LTE system that supports four antennas. Accordingly, the number of RSs per antenna (e.g., antenna port 4 to 7) will be limited even though the number of antennas increases. Meanwhile, as there is a difference between the number of RSs in the antenna ports 0 and 1 and the number of RSs in the antenna ports 2 and 3, smaller RSs of the antenna ports 6 and 7 than those of the antenna ports 4 and 5 are transmitted. The RS transmission position of the antenna ports 0 to 3 is the same as that in case of the LTE subframe, and RS transmission of additional antenna ports is performed using the other symbols.

In the same manner as the existing LTE, RS transmission interval of additional antenna ports is 6 per symbol. If channel measurement is performed for two symbols, since the transmission interval becomes 3, throughput is not deteriorated even in the case that channel delay spread is large. In case 4, the number of RSs is relatively smaller than that of RSs in case 3. However, since more data can be transmitted, if there is no difference in throughput of channel measurement between the case 3 and the case 4, the case 4 could be the method of using resources more efficiently.

Although the RS patterns of the cases 1 to 4 have been described in the embodiment of the present invention, the RS patterns will not be limited to the cases 1 to 4, and various modifications can be made in the RS patterns.

(2) Method of Transmitting DM-CRS as NDM-DRS of Rank 8 Through Switching

Figure 12:
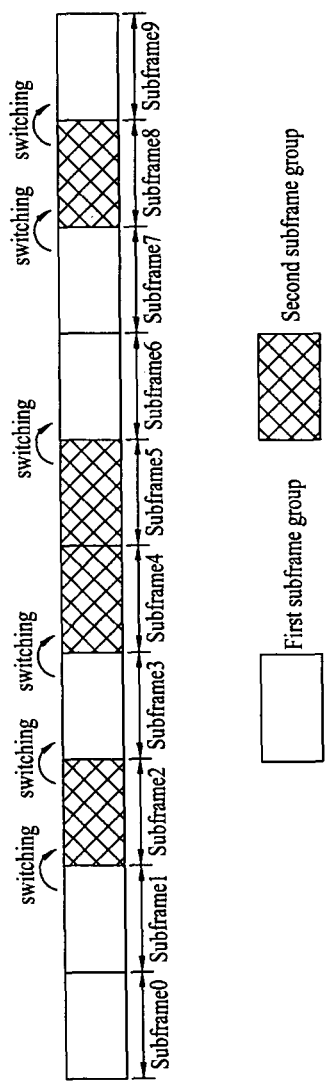
FIG. 12 is a diagram illustrating a subframe for transmitting DM-CRS in accordance with a TDM mode according to one embodiment of the present invention.

FIG. 12 is a diagram illustrating a subframe for transmitting DM-CRS in accordance with a TDM mode according to one embodiment of the present invention. In FIG. 12, a first subframe group is defined as a subframe that can be read out from all user equipments and a second subframe group is defined as a subframe that can be read out from a specific user equipment only. In this case, DM-CRS for antenna ports 0 to 3 is transmitted from the first subframe group. The first subframe group considers DRS to support RS of antenna ports 4 to 7 for a specific user equipment.

Meanwhile, DM-CRS for antenna ports 4 to 7 is transmitted from the second subframe group. The second subframe group considers DRS to support RS of antenna ports 0 to 3 for a specific user equipment. Two kinds of subframe groups can be switched with each other. For example, both the LTE user equipment and the LTE-A user equipment can access the first subframe group while only the LTE-A user equipment can access the second subframe group. Also, in the present invention, the first subframe group will be defined as the LTE subframe, and the second subframe group will be defined as the MBSFN subframe.

In the case that the LTE UE and the LTE-A UE use the same subframe, they use the same DM-CRS for the antenna ports 0 to 3, and RS for additional antenna of the LTE-A UE can be transmitted through the DRS. In this case, since the LTE-A UE cannot receive CQI-CRS separately, a problem may occur. In order to solve the problem, switching according to a TDM mode using MBSFN will be suggested. For example, the LTE subframe transmits a demodulation-common reference signal (DM-CRS) of the antenna ports 0 to 3 so as to use the DM-CRS as CQI-CRS. The MBSFN subframe transmits DM-CRS for the antenna ports 4 to 7 through subframe switching. At this time, the transmitted DM-CRS can be used as CQI-CRS for the LTE-A UE.

Figure 13:
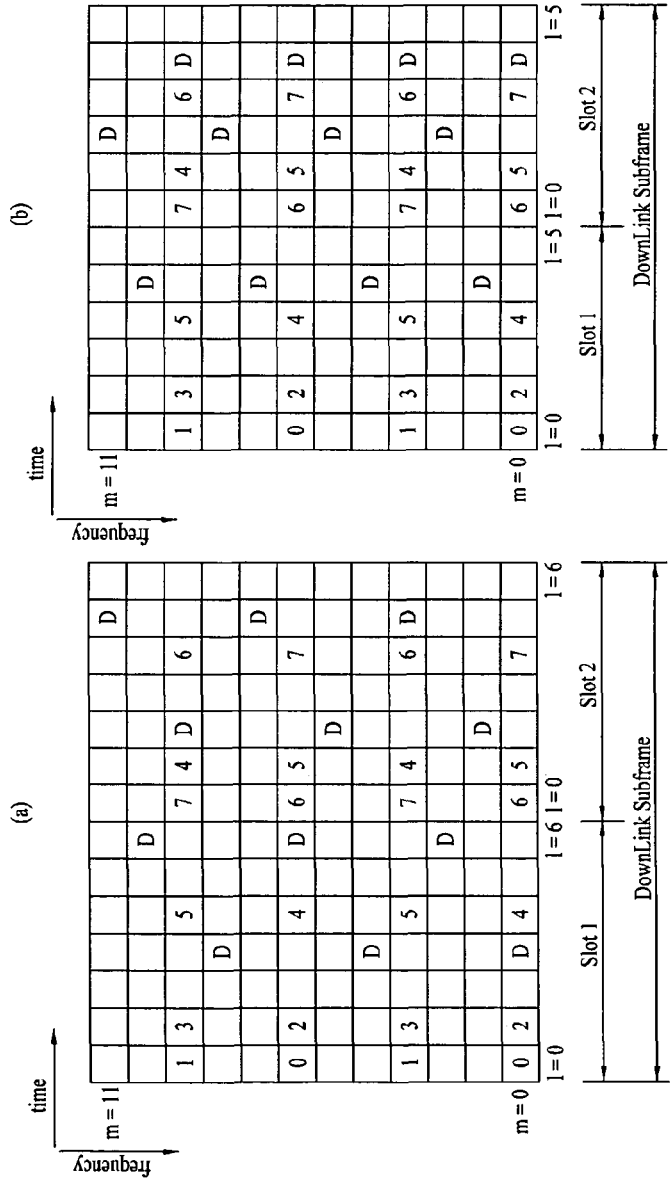
FIG. 13A is a diagram illustrating a structure of MBSFN subframe for transmitting DM-CRS when channel delay spread is short in accordance with one embodiment of the present invention.
FIG. 13B is a diagram illustrating a structure of MBSFN subframe for transmitting DM-CRS when channel delay spread is large in accordance with one embodiment of the present invention.

Meanwhile, the switched MBSFN subframe should transmit DRS (D of FIG. 13) for the antenna ports 0 to 3 if data of LTE-A are transmitted, and all RSs of the antenna ports 0 to 3 are transmitted in accordance with CDM. For example, the RSs can be transmitted in subframes illustrated in FIG. 13A and FIG. 13B. Since the second subframe is the MBSFN subframe, first two symbols of slot 1 maintain the RSs of the antenna ports 0 to 3 as they are, and use the existing RS transmission position for RS transmission of additional antenna ports.

FIG. 13A corresponds to a case where channel delay spread is large while FIG. 13B corresponds to a case where channel delay spread is large.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method of transmitting a reference signal (RS) in a downlink multi input multi output (MIMO) system that supports a first user equipment (UE) and a second UE, the first UE recognizing four predetermined transmitting antennas among eight transmitting antennas and the second UE recognizing the eight transmitting antennas, the method comprising:

generating a subframe that can be recognized by both the first UE and the second UE; and transmitting the generated subframe to the first UE and the second UE, wherein the first UE and the second UE recognize all orthogonal frequency division multiplexing (OFDM) symbols of the subframe, wherein reference signals (RSs) of the four predetermined transmitting antennas are mapped on OFDM symbols of the subframe equally to RS positions on a subframe of a system supporting only four transmitting antenna and RSs of the other of the eight transmitting antennas are mapped on other OFDM symbols excluding the OFDM symbols on which the RSs of the predetermined four antennas are mapped, wherein a number of resource elements (REs) allocated per resource block (RB) to the RSs of the four predetermined transmitting antennas and the other of the eight transmitting antennas is given as one of following cases:

|  |  | predetermined four antenna ports | | | | other antenna ports | | | |
|---|---|---|---|---|---|---|---|---|---|
| # of REs | case 1 | 8 | 8 | 4 | 4 | 8 | 8 | 4 | 4 |
|  | case 2 | 8 | 8 | 8 | 8 | 4 | 4 | 4 | 4 |
|  | case 3 | 8 | 8 | 4 | 4 | 4 | 4 | 4 | 4 |
|  | case 4 | 8 | 8 | 4 | 4 | 4 | 4 | 2 | 2. |

2. The method of claim 1, wherein:
the RS of each antenna is allocated to the subframe using pattern 1-1 or 1-2 as follows for case 1:

[pattern 1-1]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (6, 0) | (6, 3) |
| | (l, m) | (0, 6) | (0, 9) | (1, 6) | (1, 9) | (2, 6) | (2, 9) | (6, 6) | (6, 9) |
| | (l, m) | (4, 3) | (4, 0) | | | (5, 3) | (5, 0) | | |
| | (l, m) | (4, 9) | (4, 6) | | | (5, 9) | (5, 6) | | |
| Slot 2 | (l, m) | (0, 0) | (0, 3) | (1, 3) | (1, 0) | (2, 0) | (2, 3) | (6, 3) | (6, 0) |
| | (l, m) | (0, 6) | (0, 9) | (1, 9) | (1, 6) | (2, 6) | (2, 9) | (6, 9) | (6, 6) |
| | (l, m) | (4, 3) | (4, 0) | | | (5, 3) | (5, 0) | | |
| | (l, m) | (4, 9) | (4, 6) | | | (5, 9) | (5, 6) | | |

[pattern 1-2]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (3, 3) | (3, 0) | | | (4, 3) | (4, 0) | | |
| | (l, m) | (3, 9) | (3, 6) | | | (4, 9) | (4, 6) | | |
| Slot 2 | (l, m) | (0, 0) | (0, 3) | (1, 3) | (1, 0) | (2, 0) | (2, 3) | (5, 3) | (5, 0) |
| | (l, m) | (0, 6) | (0, 9) | (1, 9) | (1, 6) | (2, 6) | (2, 9) | (5, 9) | (5, 6) |
| | (l, m) | (3, 3) | (3, 0) | | | (4, 3) | (4, 0) | | |
| | (l, m) | (3, 9) | (3, 6) | | | (4, 9) | (4, 6); | | | each slot in pattern 1-1 includes seven OFDM symbols, each of which includes twelve subcarriers;
each slot in pattern 1-2 includes six OFDM symbols, each of which includes twelve subcarriers;
l represents an OFDM symbol index; and
m represents a subcarrier index.

3. The method of claim 1, wherein:
the RS of each antenna is allocated to the subframe using pattern 1-1 or 1-2 as follows for case 2:

[pattern 1-1]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (6, 0) | (6, 3) |
| | (l, m) | (0, 6) | (0, 9) | (1, 6) | (1, 9) | (2, 6) | (2, 9) | (6, 6) | (6, 9) |
| | (l, m) | (4, 3) | (4, 0) | (5, 3) | (5, 0) | | | | |
| | (l, m) | (4, 9) | (4, 6) | (5, 9) | (5, 6) | | | | |
| Slot 2 | (l, m) | (0, 0) | (0, 3) | (1, 3) | (1, 0) | (2, 3) | (2, 0) | (6, 3) | (6, 0) |
| | (l, m) | (0, 6) | (0, 9) | (1, 9) | (1, 6) | (2, 9) | (2, 6) | (6, 9) | (6, 6) |
| | (l, m) | (4, 3) | (4, 0) | (5, 0) | (5, 3) | | | | |
| | (l, m) | (4, 9) | (4, 6) | (5, 6) | (5, 9) | | | | |

[pattern 1-2]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (3, 3) | (3, 0) | (4, 3) | (4, 0) | | | | |
| | (l, m) | (3, 9) | (3, 6) | (4, 9) | (4, 6) | | | | |
| Slot 2 | (l, m) | (0, 0) | (0, 3) | (1, 3) | (1, 0) | (2, 3) | (2, 0) | (5, 3) | (5, 0) |
| | (l, m) | (0, 6) | (0, 9) | (1, 9) | (1, 6) | (2, 6) | (2, 6) | (5, 9) | (5, 6) |
| | (l, m) | (3, 3) | (3, 0) | (4, 0) | (4, 3) | | | | |
| | (l, m) | (3, 9) | (3, 6) | (4, 6) | (4, 9); | | | | | each slot in pattern 1-1 includes seven OFDM symbols, each of which includes twelve subcarriers;

each slot in pattern 1-2 includes six OFDM symbols, each of which includes twelve subcarriers;

l represents an OFDM symbol index; and m represents a subcarrier index.

4. The method of claim 1, wherein:

the RS of each antenna is allocated to the subframe using pattern 1-1 or 1-2 as follows for case 3:

[pattern 1-1]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (4, 3) | (4, 0) | | | | | | |
| | (l, m) | (4, 9) | (4, 6) | | | | | | |
| Slot 2 | (l, m) | (0, 0) | (0, 3) | (1, 3) | (1, 0) | (2, 3) | (2, 0) | (5, 3) | (5, 0) |
| | (l, m) | (0, 6) | (0, 9) | (1, 9) | (1, 6) | (2, 9) | (2, 6) | (5, 9) | (5, 6) |
| | (l, m) | (4, 3) | (4, 0) | | | | | | |
| | (l, m) | (4, 9) | (4, 6) | | | | | | |

[pattern 1-2]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | (4, 0) | (4, 3) |
| | (l, m) | (0, 6) | (0, 9) | (1, 6) | (1, 9) | (2, 6) | (2, 9) | (4, 6) | (4, 9) |
| | (l, m) | (3, 3) | (3, 0) | | | | | | |
| | (l, m) | (3, 9) | (3, 6) | | | | | | |
| Slot 2 | (l, m) | (0, 0) | (0, 3) | (1, 3) | (1, 0) | (2, 3) | (2, 0) | (4, 3) | (4, 0) |
| | (l, m) | (0, 6) | (0, 9) | (1, 9) | (1, 6) | (2, 9) | (2, 6) | (4, 9) | (4, 6) |
| | (l, m) | (3, 3) | (3, 0) | | | | | | |
| | (l, m) | (3, 9) | (3, 6); | | | | | | | each slot in pattern 1-1 includes seven OFDM symbols, each of which includes twelve subcarriers;

each slot in pattern 1-2 includes six OFDM symbols, each of which includes twelve subcarriers;

l represents an OFDM symbol index; and m represents a subcarrier index.

5. The method of claim 1, wherein:

the RS of each antenna is allocated to a subframe using pattern 1-1 or 1-2 as follows for case 4:

[pattern 1-1]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | | |
| | (l, m) | (0, 6) | (0, 9) | (1, 6) | (1, 9) | (2, 6) | (2, 9) | | |
| | (l, m) | (4, 3) | (4, 0) | | | | | | |
| | (l, m) | (4, 9) | (4, 6) | | | | | | |
| Slot 2 | (l, m) | (0, 0) | (0, 3) | (1, 3) | (1, 0) | (2, 3) | (2, 0) | (5, 0) | (5, 3) |
| | (l, m) | (0, 6) | (0, 9) | (1, 9) | (1, 6) | (2, 9) | (2, 6) | (5, 6) | (5, 9) |
| | (l, m) | (4, 3) | (4, 0) | | | | | | |
| | (l, m) | (4, 9) | (4, 6) | | | | | | |

[pattern 1-2]

| | | Antenna port | | | | | | | |
|---|---|---|---|---|---|---|---|---|---|
| | | 0 | 1 | 2 | 3 | 4 | 5 | 6 | 7 |
| Slot 1 | (l, m) | (0, 0) | (0, 3) | (1, 0) | (1, 3) | (2, 0) | (2, 3) | | |
| | (l, m) | (0, 6) | (0, 9) | (1, 6) | (1, 9) | (2, 6) | (2, 9) | | |
| | (l, m) | (3, 3) | (3, 0) | | | | | | |
| | (l, m) | (3, 9) | (3, 6) | | | | | | |
| Slot 2 | (l, m) | (0, 0) | (0, 3) | (1, 3) | (1, 0) | (2, 3) | (2, 0) | (4, 0) | (4, 3) |
| | (l, m) | (0, 6) | (0, 9) | (1, 9) | (1, 6) | (2, 9) | (2, 6) | (4, 6) | (4, 9) |
| | (l, m) | (3, 3) | (3, 0) | | | | | | |
| | (l, m) | (3, 9) | (3, 6); | | | | | | | each slot in pattern 1-1 includes seven OFDM symbols, each of which includes twelve subcarriers;

each slot in pattern 1-2 includes six OFDM symbols, each of which includes twelve subcarriers;

l represents an OFDM symbol index; and m represents a subcarrier index.

6. A method of transmitting a reference signal (RS) in a downlink multi input multi output (MIMO) system that supports eight transmitting antennas, the method comprising:

generating a subframe including an RS; and transmitting the generated subframe to a user equipment (UE), wherein:

RSs of four predetermined transmitting antennas among the eight transmitting antennas are mapped on a first OFDM symbol and a second OFDM symbol of the subframe;

RSs of one or more of the other antennas among the eight transmitting antennas are mapped on other OFDM symbols that are recognized only by a UE that supports the eight transmitting antennas, a number of resource elements (REs) allocated per resource block (RB) to the RSs of the four predetermined transmitting antennas and the other of the eight transmitting antennas is given as one of following cases:

| | | predetermined four antenna ports | | | | other antenna ports | | | |
|---|---|---|---|---|---|---|---|---|---|
| # of REs | case 1 | 8 | 8 | 4 | 4 | 8 | 8 | 4 | 4 |
| | case 2 | 8 | 8 | 8 | 8 | 4 | 4 | 4 | 4 |
| | case 3 | 8 | 8 | 4 | 4 | 4 | 4 | 4 | 4 |
| | case 4 | 8 | 8 | 4 | 4 | 4 | 4 | 2 | 2. |

7. The method of claim 6, wherein:

the RS of each antenna is allocated to the subframe using pattern 1-1 or 1-2 as follows for case 1:

[pattern 1-1]

| | | \multicolumn{8}{c}{Antenna port} |
|---|---|---|---|---|---|---|---|---|---|

| | | 0 | 1 | 2 | 3 | 4 | 5 | 6 | 7 |
|---|---|---|---|---|---|---|---|---|---|
| Slot 1 | (l, m) | (0, 0) | (0, 3) | (1, 0) | (1, 3) | (2, 0) | (2, 3) | (6, 0) | (6, 3) |
| | (l, m) | (0, 6) | (0, 9) | (1, 6) | (1, 9) | (2, 6) | (2, 9) | (6, 6) | (6, 9) |
| | (l, m) | (4, 3) | (4, 0) | | | (5, 3) | (5, 0) | | |
| | (l, m) | (4, 9) | (4, 6) | | | (5, 9) | (5, 6) | | |
| Slot 2 | (l, m) | (0, 0) | (0, 3) | (1, 3) | (1, 0) | (2, 0) | (2, 3) | (6, 3) | (6, 0) |
| | (l, m) | (0, 6) | (0, 9) | (1, 9) | (1, 6) | (2, 6) | (2, 9) | (6, 9) | (6, 6) |
| | (l, m) | (4, 3) | (4, 0) | | | (5, 3) | (5, 0) | | |
| | (l, m) | (4, 9) | (4, 6) | | | (5, 9) | (5, 6) | | |

[pattern 1-2]

| | | 0 | 1 | 2 | 3 | 4 | 5 | 6 | 7 |
|---|---|---|---|---|---|---|---|---|---|
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (3, 3) | (3, 0) | | | (4, 3) | (4, 0) | | |
| | (l, m) | (3, 9) | (3, 6) | | | (4, 9) | (4, 6) | | |
| Slot 2 | (l, m) | (0, 0) | (0, 3) | (1, 3) | (1, 0) | (2, 0) | (2, 3) | (5, 3) | (5, 0) |
| | (l, m) | (0, 6) | (0, 9) | (1, 9) | (1, 6) | (2, 6) | (2, 9) | (5, 9) | (5, 6) |
| | (l, m) | (3, 3) | (3, 0) | | | (4, 3) | (4, 0) | | |
| | (l, m) | (3, 9) | (3, 6) | | | (4, 9) | (4, 6); | | | each slot in pattern 1-1 includes seven OFDM symbols, each of which includes twelve subcarriers;

each slot in pattern 1-2 includes six OFDM symbols, each of which includes twelve subcarriers;

l represent an OFDM symbol index; and m represents a subcarrier index.

8. The method of claim 6, wherein:

the RS of each antenna is allocated to the subframe using pattern 1-1 or 1-2 as follows for case 2:

[pattern 1-1]

| | | 0 | 1 | 2 | 3 | 4 | 5 | 6 | 7 |
|---|---|---|---|---|---|---|---|---|---|
| Slot 1 | (l, m) | (0, 0) | (0, 3) | (1, 0) | (1, 3) | (2, 0) | (2, 3) | (6, 0) | (6, 3) |
| | (l, m) | (0, 6) | (0, 9) | (1, 6) | (1, 9) | (2, 6) | (2, 9) | (6, 6) | (6, 9) |
| | (l, m) | (4, 3) | (4, 0) | (5, 3) | (5, 0) | | | | |
| | (l, m) | (4, 9) | (4, 6) | (5, 9) | (5, 6) | | | | |
| Slot 2 | (l, m) | (0, 0) | (0, 3) | (1, 3) | (1, 0) | (2, 3) | (2, 0) | (6, 3) | (6, 0) |
| | (l, m) | (0, 6) | (0, 9) | (1, 9) | (1, 6) | (2, 9) | (2, 6) | (6, 9) | (6, 6) |
| | (l, m) | (4, 3) | (4, 0) | (5, 0) | (5, 3) | | | | |
| | (l, m) | (4, 9) | (4, 6) | (5, 6) | (5, 9) | | | | |

[pattern 1-2]

| | | 0 | 1 | 2 | 3 | 4 | 5 | 6 | 7 |
|---|---|---|---|---|---|---|---|---|---|
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (3, 3) | (3, 0) | (4, 3) | (4, 0) | | | | |
| | (l, m) | (3, 9) | (3, 6) | (4, 9) | (4, 6) | | | | |
| Slot 2 | (l, m) | (0, 0) | (0, 3) | (1, 3) | (1, 0) | (2, 3) | (2, 0) | (5, 3) | (5, 0) |
| | (l, m) | (0, 6) | (0, 9) | (1, 9) | (1, 6) | (2, 6) | (2, 6) | (5, 9) | (5, 6) |
| | (l, m) | (3, 3) | (3, 0) | (4, 0) | (4, 3) | | | | |
| | (l, m) | (3, 9) | (3, 6) | (4, 6) | (4, 9); | | | | | each slot in pattern 1-1 includes seven OFDM symbols, each of which includes twelve subcarriers;

each slot in pattern 1-2 includes six OFDM symbols, each of which includes twelve subcarriers;

l represents an OFDM symbol index; and m represents a subcarrier index.

9. The method of claim 6, wherein:

the RS of each antenna is allocated to the subframe using pattern 1-1 or 1-2 as follows for case 3:

[pattern 1-1]

| | | 0 | 1 | 2 | 3 | 4 | 5 | 6 | 7 |
|---|---|---|---|---|---|---|---|---|---|
| Slot 1 | (l, m) | (0, 0) | (0, 3) | (1, 0) | (1, 3) | (2, 0) | (2, 3) | (5, 0) | (5, 3) |
| | (l, m) | (0, 6) | (0, 9) | (1, 6) | (1, 9) | (2, 6) | (2, 9) | (5, 6) | (5, 9) |
| | (l, m) | (4, 3) | (4, 0) | | | | | | |
| | (l, m) | (4, 9) | (4, 6) | | | | | | |
| Slot 2 | (l, m) | (0, 0) | (0, 3) | (1, 3) | (1, 0) | (2, 3) | (2, 0) | (5, 3) | (5, 0) |
| | (l, m) | (0, 6) | (0, 9) | (1, 9) | (1, 6) | (2, 9) | (2, 6) | (5, 9) | (5, 6) |
| | (l, m) | (4, 3) | (4, 0) | | | | | | |
| | (l, m) | (4, 9) | (4, 6) | | | | | | |

[pattern 1-2]

| | | 0 | 1 | 2 | 3 | 4 | 5 | 6 | 7 |
|---|---|---|---|---|---|---|---|---|---|
| Slot 1 | (l, m) | (0, 0) | (0, 3) | (1, 0) | (1, 3) | (2, 0) | (2, 3) | (4, 0) | (4, 3) |
| | (l, m) | (0, 6) | (0, 9) | (1, 6) | (1, 9) | (2, 6) | (2, 9) | (4, 6) | (4, 9) |
| | (l, m) | (3, 3) | (3, 0) | | | | | | |
| | (l, m) | (3, 9) | (3, 6) | | | | | | |
| Slot 2 | (l, m) | (0, 0) | (0, 3) | (1, 3) | (1, 0) | (2, 3) | (2, 0) | (4, 3) | (4, 0) |
| | (l, m) | (0, 6) | (0, 9) | (1, 9) | (1, 6) | (2, 9) | (2, 6) | (4, 9) | (4, 6) |
| | (l, m) | (3, 3) | (3, 0) | | | | | | |
| | (l, m) | (3, 9) | (3, 6) | | | | | | | each slot in pattern 1-1 includes seven OFDM symbols, each of which includes twelve subcarriers;

each slot in pattern 1-2 includes six OFDM symbols, each of which includes twelve subcarriers;

l represents an OFDM symbol index; and m represents a subcarrier index.

10. The method of claim 6, wherein:

the RS of each antenna is allocated to a subframe using pattern 1-1 or 1-2 as follows for case 4:

[pattern 1-1]

|  |  | Antenna port | | | | | | | |
|---|---|---|---|---|---|---|---|---|---|
|  |  | 0 | 1 | 2 | 3 | 4 | 5 | 6 | 7 |
| Slot 1 | (l, m) | (0, 0) | (0, 3) | (1, 0) | (1, 3) | (2, 0) | (2, 3) |  |  |
|  | (l, m) | (0, 6) | (0, 9) | (1, 6) | (1, 9) | (2, 6) | (2, 9) |  |  |
|  | (l, m) | (4, 3) | (4, 0) |  |  |  |  |  |  |
|  | (l, m) | (4, 9) | (4, 6) |  |  |  |  |  |  |
| Slot 2 | (l, m) | (0, 0) | (0, 3) | (1, 3) | (1, 0) | (2, 3) | (2, 0) | (5, 0) | (5, 3) |
|  | (l, m) | (0, 6) | (0, 9) | (1, 9) | (1, 6) | (2, 9) | (2, 6) | (5, 6) | (5, 9) |
|  | (l, m) | (4, 3) | (4, 0) |  |  |  |  |  |  |
|  | (l, m) | (4, 9) | (4, 6) |  |  |  |  |  |  |

[pattern 1-2]

|  |  | Antenna port | | | | | | | |
|---|---|---|---|---|---|---|---|---|---|
|  |  | 0 | 1 | 2 | 3 | 4 | 5 | 6 | 7 |
| Slot 1 | (l, m) | (0, 0) | (0, 3) | (1, 0) | (1, 3) | (2, 0) | (2, 3) |  |  |
|  | (l, m) | (0, 6) | (0, 9) | (1, 6) | (1, 9) | (2, 6) | (2, 9) |  |  |
|  | (l, m) | (3, 3) | (3, 0) |  |  |  |  |  |  |
|  | (l, m) | (3, 9) | (3, 6) |  |  |  |  |  |  |
| Slot 2 | (l, m) | (0, 0) | (0, 3) | (1, 3) | (1, 0) | (2, 3) | (2, 0) | (4, 0) | (4, 3) |
|  | (l, m) | (0, 6) | (0, 9) | (1, 9) | (1, 6) | (2, 9) | (2, 6) | (4, 6) | (4, 9) |
|  | (l, m) | (3, 3) | (3, 0) |  |  |  |  |  |  |
|  | (l, m) | (3, 9) | (3, 6) |  |  |  |  |  |  | each slot in pattern 1-1 includes seven OFDM symbols, each of which includes twelve subcarriers;
each slot in pattern 1-2 includes six OFDM symbols, each of which includes twelve subcarriers;
l represents an OFDM symbol index; and
m represents a subcarrier index.

11. The method of claim 6, wherein the subframe is a multicast broadcast single frequency network (MBSFN) subframe.

12. The method of claim 6, wherein the RSs of the other of the eight transmitting antennas excluding the four predetermined transmitting antennas are common reference signals (CRSs).

13. A method of transmitting a reference signal (RS) in a downlink multi input multi output (MIMO) system that supports a first user equipment (UE) and a second UE, the first UE recognizing four predetermined transmitting antennas of a total of eight transmitting antennas and the second UE recognizing the eight transmitting antennas, the method comprising:

transmitting a first subframe that can be recognized by both the first UE and the second UE; and transmitting a second subframe that can be recognized by the only second UE, wherein common reference signals (CRSs) of antenna ports 0 to 3 of the eight transmitting antennas are mapped to the first subframe, wherein CRSs of antenna ports 4-7 of eight transmitting antennas are mapped to the second subframe, and wherein a number of resource elements (REs) allocated to the RSs of the four predetermined transmitting antennas and the other of the eight transmitting antennas per resource block (RB) is given as one of following cases:

|  |  | Antenna port | | | | | | | |
|---|---|---|---|---|---|---|---|---|---|
|  |  | 0 | 1 | 2 | 3 | 4 | 5 | 6 | 7 |
| # of REs | case 1 | 8 | 8 | 4 | 4 | 8 | 8 | 4 | 4 |
|  | case 2 | 8 | 8 | 8 | 8 | 4 | 4 | 4 | 4 |
|  | case 3 | 8 | 8 | 4 | 4 | 4 | 4 | 4 | 4 |
|  | case 4 | 8 | 8 | 4 | 4 | 4 | 4 | 2 | 2. |

14. The method of claim 13, wherein the second subframe is a multicast broadcast single frequency network (MBSFN) subframe.

15. The method of claim 13, wherein:

dedicated reference signals (DRSs) of antenna ports 0 to 3 are mapped on a portion of OFDM symbols except first and second OFDM symbols of the second subframe; and the DRSs are UE-specific reference signals.

* * * * *